(12) United States Patent
Jones et al.

(10) Patent No.: US 9,007,440 B1
(45) Date of Patent: *Apr. 14, 2015

(54) METHOD AND SYSTEM FOR DISPLAYING PANORAMIC IMAGERY

(71) Applicant: Google Inc., Mountain View, CA (US)

(72) Inventors: Jonah Jones, Darlinghurst (AU); Matthew Robert Simpson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,069

(22) Filed: May 19, 2014

Related U.S. Application Data

(63) Continuation of application No. 13/348,048, filed on Jan. 11, 2012, now Pat. No. 8,767,040.

(51) Int. Cl.
*H04N 7/00* (2011.01)
*G06T 3/00* (2006.01)
*H04N 5/232* (2006.01)

(52) U.S. Cl.
CPC .......... *G06T 3/0087* (2013.01); *H04N 5/23238* (2013.01)

(58) Field of Classification Search
CPC ... G06T 15/20; G06T 3/4038; H04N 5/23238
See application file for complete search history.

(56) References Cited

U.S. PATENT DOCUMENTS

| | | | |
|---|---|---|---|
| 5,276,785 A | 1/1994 | Mackinlay et al. | |
| 5,541,726 A | 7/1996 | Nakajima | |
| 6,192,393 B1 | 2/2001 | Tarantino et al. | |
| 6,549,650 B1 | 4/2003 | Ishikawa et al. | |
| 7,469,381 B2 | 12/2008 | Ording | |
| 7,890,256 B2 | 2/2011 | Han | |
| 7,990,394 B2 | 8/2011 | Vincent et al. | |
| 8,063,929 B2 | 11/2011 | Kurtz et al. | |
| 8,175,794 B1 | 5/2012 | Szybalski | |
| 2008/0062173 A1 | 3/2008 | Tashiro | |
| 2010/0123737 A1 | 5/2010 | Williamson et al. | |
| 2010/0171691 A1 | 7/2010 | Cook et al. | |
| 2010/0188397 A1 | 7/2010 | Tsai et al. | |
| 2010/0215250 A1 | 8/2010 | Zhu | |
| 2010/0283781 A1 | 11/2010 | Kriveshko et al. | |
| 2011/0254915 A1 | 10/2011 | Vincent et al. | |
| 2013/0208133 A1 | 8/2013 | Yamazaki et al. | |

OTHER PUBLICATIONS

Adobe Flash Catalyst CS5.6—6 pages, Dec. 11, 2011.
International Search Report from PCT/US13/21149—2 pages, Nov. 2009.

*Primary Examiner* — Huy T Nguyen

(74) *Attorney, Agent, or Firm* — Dority & Manning, P.A.

(57) ABSTRACT

Methods and systems for navigating panoramic imagery are provided. If a user rotates panoramic imagery to a view having a view angle that deviates beyond a threshold view angle, the view of the panoramic imagery will be adjusted to the threshold view angle. In a particular implementation, the view is drifted to the threshold view angle so that a user can at least temporarily view the imagery that deviates beyond the threshold view angle. A variety of transition animations can be used as the imagery is drifted to the threshold view angle. For instance, the view can be elastically snapped back to the threshold view angle to provide a visually appealing transition to a user.

20 Claims, 8 Drawing Sheets

METHOD AND SYSTEM FOR DISPLAYING PANORAMIC IMAGERY

PRIORITY CLAIM

The present application is a continuation of U.S. application Ser. No. 13/348,048 having a filing date of Jan. 11, 2012. Applicants claim priority to and benefit of all such applications and incorporate all such applications herein by reference.

FIELD

The present disclosure relates generally to displaying imagery, and more particularly to displaying panoramic imagery.

BACKGROUND

Computerized methods and systems for displaying imagery, in particular panoramic imagery are known. In the context of geographic information systems and digital mapping systems, services such as Google Maps are capable of providing street level images of geographical locations. The images, known on Google Maps as "Street View," typically provide immersive 360° panoramic views centered around a geographic area of interest. The panoramic views allow a user to view a geographic location from a person's perspective, as if the user was located on the street level or ground level associated with the geographic location.

User interfaces for navigating panoramic imagery typically allow a user to pan, tilt, rotate, and zoom the panoramic imagery. In certain cases, a user can navigate to a particular view of the imagery that makes further navigation cumbersome. For instance, a user can navigate to a state in which the user is looking directly up or directly down. Due to a lack of features depicted in these views, it can be disorienting and difficult to navigate from these views, leading to user frustration.

SUMMARY

Aspects and advantages of the invention will be set forth in part in the following description, or may be obvious from the description, or may be learned through practice of the invention.

One exemplary aspect of the present disclosure is directed to a computer-implemented method for navigating panoramic imagery. The method includes presenting a first view of at least a portion of the panoramic imagery at a first view angle on a viewport of a display device; receiving a user input to rotate the view of the panoramic imagery to a second view angle; rotating the view of the panoramic imagery from the first view angle to the second view angle; and determining whether the second view angle deviates beyond a threshold view angle. If the second view angle deviates beyond the threshold view angle, the method includes adjusting the view of the panoramic imagery from the second view angle to the threshold view angle.

Other exemplary implementations of the present disclosure are directed to systems, apparatus, computer-readable media, devices, and user interfaces for navigating panoramic imagery.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
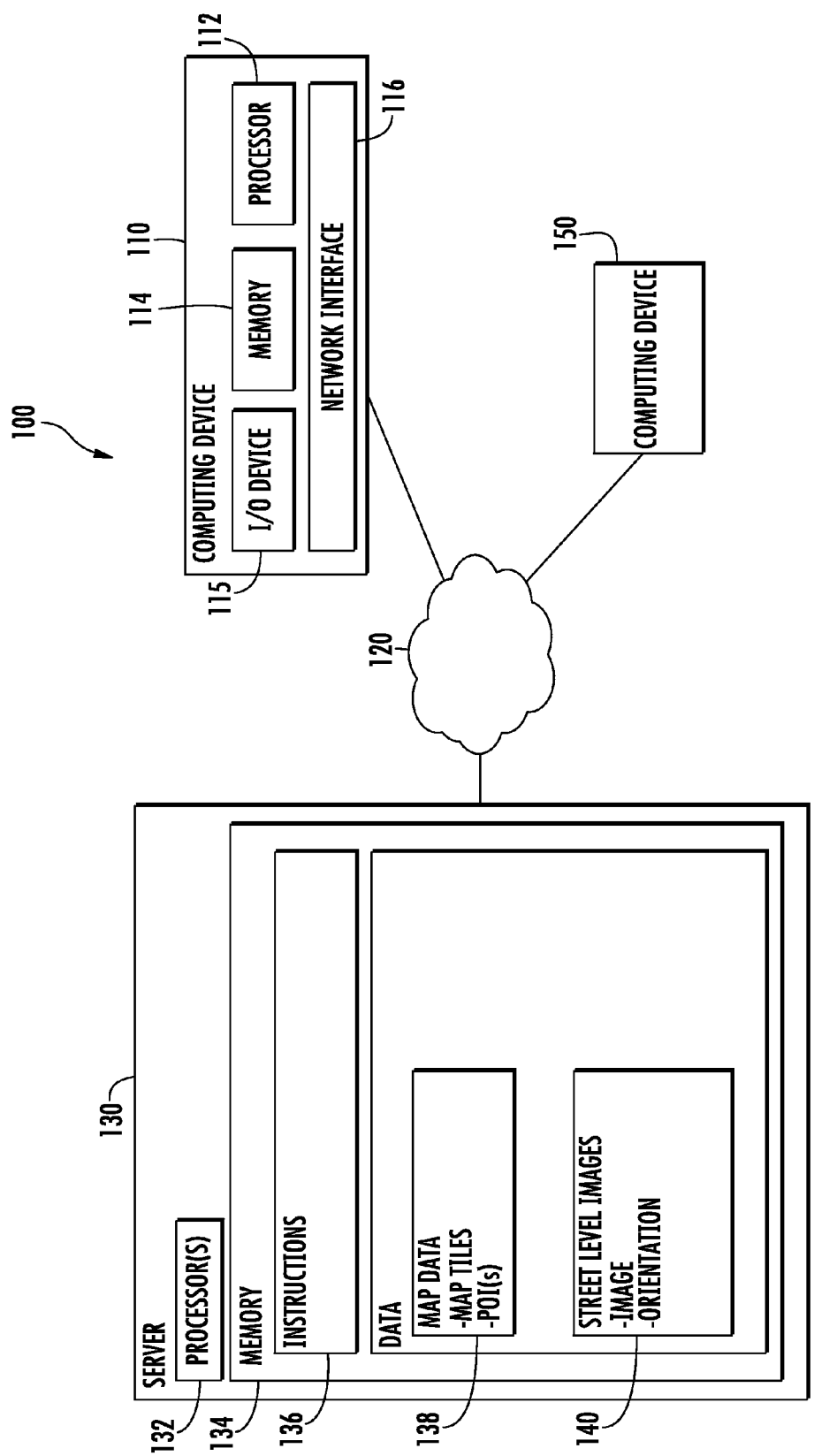
FIG. 1 depicts an exemplary system for displaying panoramic imagery according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to navigating imagery, such as immersive panoramic imagery associated with a geographic area. According to aspects of the present disclosure, one or more threshold view angles associated with the imagery are defined such that if a user navigates past one of the threshold view angles, the view of the panoramic imagery will drift back to the threshold view angle. Because the view drifts back to the threshold view angle, users are allowed at least temporarily to view imagery beyond the threshold angle, while avoiding situations where users are stuck in potentially disorienting and/or cumbersome views.

For example, in one particular implementation, a maximum tilt angle relative to a horizontal axis associated with the imagery can be defined such that if a user rotates the imagery beyond the maximum tilt angle, the view will drift back to the maximum tilt angle. In this example, if a user drags or rotates the imagery too high or too low, the view will shift back closer to the horizon to prevent the user from being stuck in a view in which the user is looking directly up or down.

As another example, one or more angles about the azimuth of the imagery can be defined as threshold angles. In this example, if a user rotates or drags the view in the azimuthal direction past a threshold view angle, the view will shift back to the closest threshold view angle. In a particular implementation, the threshold view angles can be defined based on canonical views or predominate features associated with the imagery so that a user can more easily navigate among predominate views of an area of interest. For instance, if a user rotates past a view of a predominate feature of interest, the view will drift back to the predominate view so that the user does not have to navigate with precision to observe the predominate feature.

According to a particular aspect of the present disclosure, various transition animations can be used to animate the drifting of the view to the threshold view angle. For instance, in one exemplary implementation, the transition animation can include drifting the view at a constant drift rate. In another exemplary implementation, the transition animation can include drifting the view at varying drift rates, such as at a slower drift rate as the view angle approaches the threshold view angle. In still another exemplary implementation, the view can include elastically snapping back the view to the threshold view angle. The use of transition animations can provide a more appealing visual experience to the user as the imagery drifts back to a threshold view angle. In this manner, the present subject matter can provide for an improved user experience while navigating imagery.

FIG. 1 depicts an exemplary system 100 for displaying panoramic imagery according to an exemplary embodiment of the present disclosure. While the present disclosure is discussed with reference to panoramic imagery, those of ordinary skill in the art, using the disclosures provided herein, should understand that the present subject matter is equally applicable for use with any type of imagery, such as the three-dimensional imagery provided in Google Earth, oblique view imagery, street map imagery, satellite imagery, or other suitable imagery.

As illustrated, system 100 includes a computing device 110 for displaying immersive panoramic images to a user. The computing device 110 device can take any appropriate form, such as a personal computer, smartphone, desktop, laptop, PDA, tablet, or other computing device. The computing device 110 includes appropriate input and output devices 115, such as a display screen, touch screen, touch pad, data entry keys, mouse, speakers, and/or a microphone suitable for voice recognition. A user can request panoramic imagery by interacting with an appropriate user interface on computing device 110. The computing device 110 can then receive panoramic imagery and data associated with the panoramic imagery and present at least a portion of the panoramic imagery through a viewport on any suitable output device, such as through a viewport set forth in a browser presented on a display screen.

Figure 2:
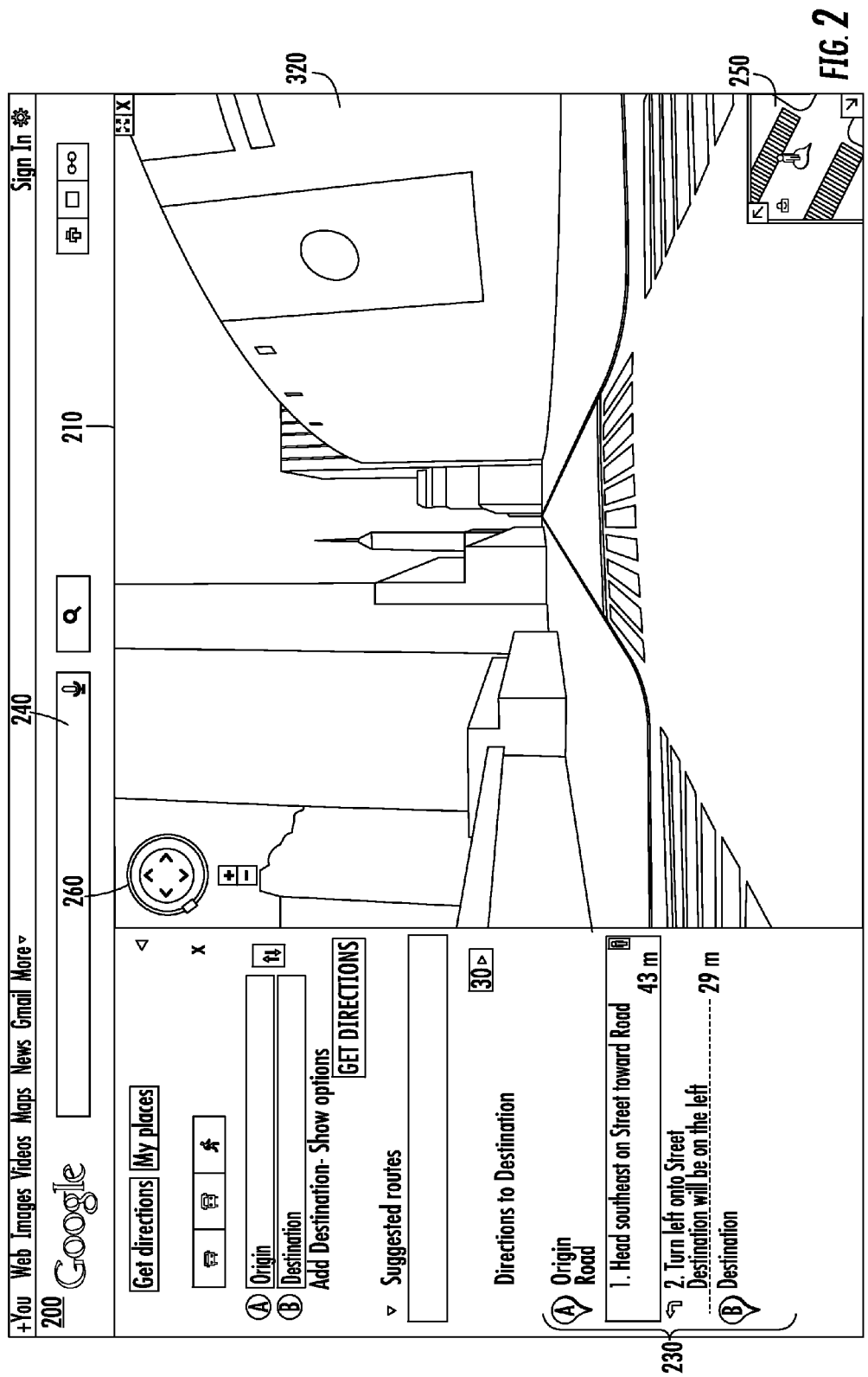
FIG. 2 depicts an exemplary user interface for displaying panoramic imagery according to an exemplary embodiment of the present disclosure.

FIG. 2 depicts an exemplary user interface 200, such as a browser, for computing device 110. User interface 200 includes a viewport 210 that displays a portion of immersive panoramic imagery, such as street level image 320. Street level image 320 depicts images of objects captured by one or more cameras from a perspective at or near the ground level or street level. Although the present disclosure uses the term "street level" images, the panoramas can depict non-street areas such as trails and building interiors. As shown, street level image 320 can provide an immersive viewing experience of a geographic area to a user.

Referring back to FIG. 1, the computing device 110 includes a processor(s) 112 and a memory 114. The processor(s) 112 can be any known processing device. Memory 114 can include any suitable computer-readable medium or media, including, but not limited to, RAM, ROM, hard drives, flash drives, or other memory devices. Memory 114 stores information accessible by processor(s) 112, including instructions that can be executed by processor(s) 112. The instructions can be any set of instructions that when executed by the processor(s) 112, cause the processor(s) 112 to provide desired functionality. For instance, the instructions can be software instructions rendered in a computer-readable form. When software is used, any suitable programming, scripting, or other type of language or combinations of languages can be used to implement the teachings contained herein. Alternatively, the instructions can be implemented by hard-wired logic or other circuitry, including, but not limited to application-specific circuits.

The computing device 110 can include a network interface 116 for accessing information over a network 120. The network 120 can include a combination of networks, such as cellular network, WiFi network, LAN, WAN, the Internet, and/or other suitable network and can include any number of wired or wireless communication links. For instance, computing device 110 can communicate through a cellular network using a WAP standard or other appropriate communication protocol. The cellular network could in turn communicate with the Internet, either directly or through another network.

Computing device 110 can communicate with another computing device 130 over network 120. Computing device 130 can be a server, such as a web server, that provides information to a plurality of client computing devices, such as computing devices 110 and 150 over network 120. Computing device 130 receives requests from computing device 110 and locates information to return to computing devices 110 responsive to the request. The computing device 130 can take any applicable form, and can, for instance, include a system that provides mapping services, such as the Google Maps services provided by Google Inc.

Similar to computing device 110, computing device 130 includes a processor(s) 132 and a memory 134. Memory 134 can include instructions 136 for receiving requests for geographic information, such as a request for street level images from a client device, and for providing the requested information to the client device for presentation to the user. Memory 134 can also include or be coupled to various databases containing information for presentation to a user. For instance, memory 134 can include a map database 138 and a street level image database 140. In addition, computing device 130 can communicate with other databases as needed. The databases can be connected to computing device 130 by a high bandwidth LAN or WAN, or could also be connected to computing device 130 through network 120. The databases, including map database 138 and street level image database 140 can be split up so that they are located in multiple locales.

Map database 138 stores map-related information, at least a portion of which can be transmitted to a client device, such as computing device 110. For instance, map database 138 can store map tiles, where each tile is an image of a particular geographic area. Depending on the resolution (e.g. whether the map is zoomed in or out), a single tile can cover a large geographic area in relatively little detail or just a few streets in high detail. The map information is not limited to any particular format. For example, the images can include street maps, satellite images, oblique view images, or combinations of these.

The various map tiles are each associated with geographical locations, such that the computing device 130 is capable of selecting, retrieving and transmitting one or more tiles in response to receipt of a geographical location. The locations can be expressed in various ways including but not limited to latitude/longitude positions, street addresses, points on a map, building names, and other data capable of identifying geographic locations.

The map database 138 can also include points of interest. A point of interest can be any item that is interesting to one or more users and that is associated with a geographical location. For instance, a point of interest can include a landmark, stadium, park, monument, restaurant, business, building, or other suitable point of interest. A point of interest can be added to the map database 138 by professional map providers, individual users, or other entities.

The map database 138 can also store street information. In addition to street images in the tiles, the street information can include the location of a street relative to a geographic area or other streets. For instance, it can store information indicating whether a traveler can access one street directly from another street. Street information can further include street names where available, and potentially other information, such as distance between intersections and speed limits.

The street level image database 140 stores street level images associated with the geographic locations. Street level images comprise images of objects at geographic locations captured by cameras positioned at the geographic location from a perspective at or near the ground level or street level. Although the term "street level" images is used, the images can depict non-street areas such as trails and building interiors. An exemplary street level image 320 is depicted in FIG. 2. The street level image 320 can depict objects such as buildings, trees, monuments, etc. from a perspective of a few feet above the ground. The street level images can be used to provide an immersive 360° panoramic viewing experience to a user centered around a geographic area of interest.

The images can be captured using any suitable technique. For instance, the street level images can be captured by a camera mounted on top of a vehicle, from a camera angle pointing roughly parallel to the ground and from a camera position at or below the legal limit for vehicle heights (e.g. 7-14 feet). Street level images are not limited to any particular height above the ground. For example, a street level image can be taken from the top of a building. Panoramic street level images can be created by stitching together the plurality of photographs taken from the different angles. The panoramic image can be presented as a flat surface or as a texture-mapped three dimensional surface such as, for instance, a cylinder or a sphere.

The street level images can be stored in the street level database 140 as a set of pixels associated with color and brightness values. For instance, if the images are stored in JPEG format, the image can be displayed as a set of pixels in rows and columns, with each pixel being associated with a value that defines the color and brightness of the image at the pixel's location.

In addition to being associated with geographic locations, the street level images used to make up the 360° panoramic imagery can be associated with information indicating the orientation or view angle of the view depicted in street level image. The view angle of a particular street level image can be the camera angle associated with a particular view, and can be defined by both a tilt angle and an azimuthal angle. The tilt angle of a view depicted in a street level image can be the angle of the view relative to a horizontal axis. The azimuthal angle can be a specific angle about the 360° panoramic image relative to a reference angle, such as a view angle associated with true north. For instance, the azimuthal angle of a particular view can be 30° east of true north.

Figure 3:
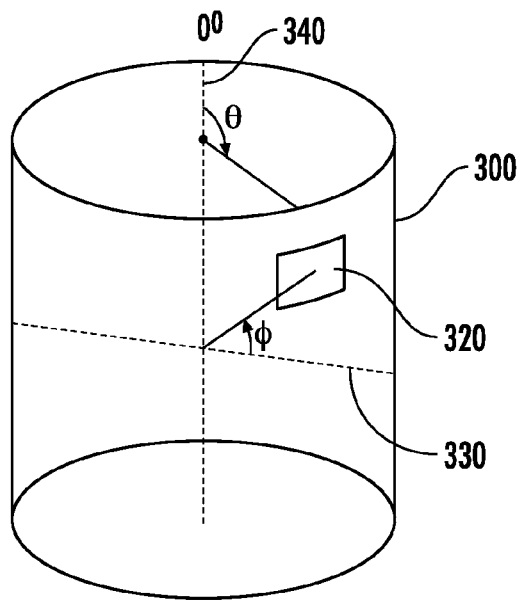
FIGS. 3 and 4 provide a conceptual illustration of an exemplary 360° panoramic image presented as a three-dimensional cylindrical surface about a geographic point of interest.
Figure 4:
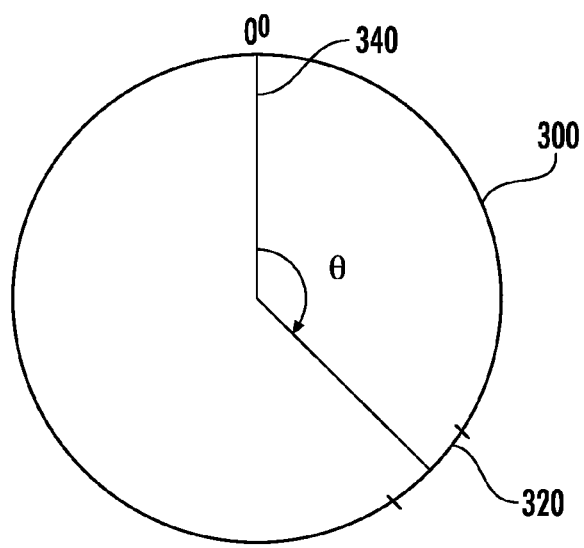

The view angle of an exemplary street level image can be more readily understood with reference to FIGS. 3 and 4. FIGS. 3 and 4 provide a conceptual illustration of an exemplary 360° panoramic image 300 presented as a three-dimensional cylindrical surface about a geographic point of interest. The panoramic image 300 could also be presented as a flat surface or a spherical surface. The panoramic image 300 includes a plurality of street level images, such as street level image 320, that provide various views of the geographic area depicted in the panoramic image 300. Each of the street level images that make up panoramic image 300 is associated with a view angle defined by a tilt angle and/or azimuthal angle for the view presented in the street level image.

For instance, street level image 320 is associated with a tilt angle $\phi$ relative to a horizontal axis 330. Street level image is also associated with an azimuthal angle $\theta$ about the panoramic image 300 relative to a predefined direction 340. The predefined direction 340 or 0° azimuthal reference can be associated with a direction such as true north, or can be associated with a canonical view or predominate feature of interest depicted in the panoramic image 300.

Referring back to FIG. 1, computing device 130 can provide mapping information, including street level images and associated orientation information to computing device 110 over network 120. The information can be provided to computing device 110 in any suitable format. The information can include information in HTML code, XML messages, WAP code, Flash, Java applets, xhtml, plain text, voiceXML, VoxML, VXML, or other suitable format. The computing device 110 can display the information to the user in any suitable format. In one embodiment, the information can be displayed within a browser, such as Google Chrome or other suitable browser.

FIG. 2 depicts an exemplary user interface 200 displaying immersive panoramic imagery, such as street level imagery 320 through a viewport 210. User interface 200 can be a browser display that presents information associated with both a mapping service and immersive panoramic imagery. For instance, in addition to street level imagery 320, user interface could display a map and other information, such as travel directions 230 to a user. The user interface 200 can be presented on any suitable computing device, such as a mobile device, smartphone, PDA, tablet, laptop, desktop, or other suitable computing device.

The user interface 200 can provide flexibility to the user in requesting street level imagery associated with a geographic area to be displayed through viewport 210. For instance, the user can enter text in a search field 240, such as an address, the name of a building, or a particular latitude and longitude. The user could also use an input device such as a mouse or touch-screen to select a particular geographic location shown on a map. Yet further, the user interface 200 can provide an icon or other feature that allows a user to request a street level view at the specified geographic location. When providing a street level image through viewport 210, the user interface 200 can indicate the location and orientation of the view with a street level viewpoint signifier 250.

The user interface 200 can include user-selectable controls 260 for navigating the viewpoint associated with the imagery 320. The controls can include controls for zooming the image in and out, as well as controls to change the orientation of the view depicted in the imagery 320. A user can also adjust the viewpoint by selecting and dragging the imagery to different views, for instance, with a user manipulable cursor or through interaction with a touch screen. If the street level image was downloaded as an entire 360° panorama, changing the direction of the view may necessitate only displaying a different portion of the panorama without retrieving more information from a server. Other navigation controls can be included as well, such as controls in the form of arrows disposed along a street that can be selected to move the vantage point up and down the street.

Figure 5:
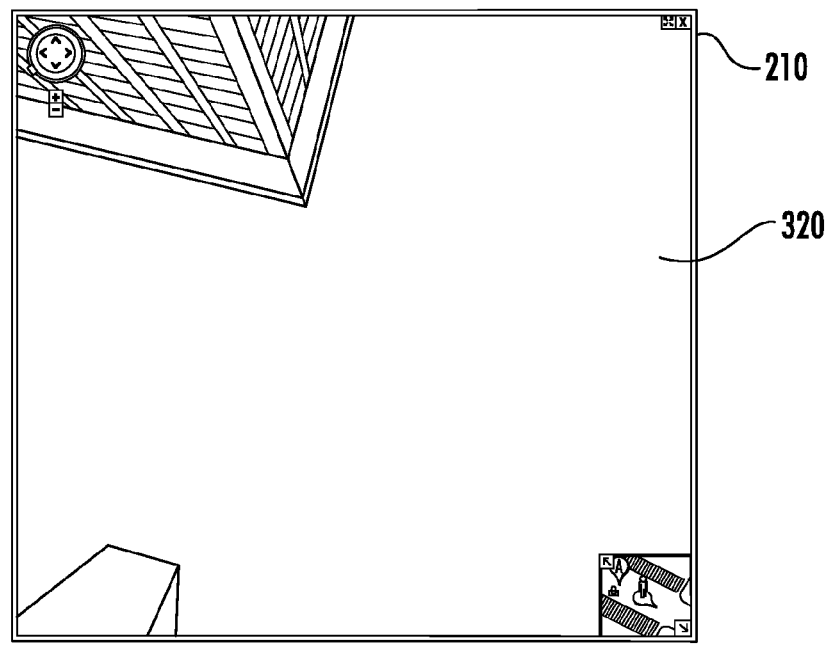
FIG. 5 depicts an exemplary street level image having a tilt angle that has deviated beyond a threshold tilt angle according to an exemplary embodiment of the present disclosure.

In certain cases, a user can navigate the imagery to a view that can be disorienting or difficult to navigate from. For example, as shown in FIG. 5, a user can navigate to a view of imagery 320 that is looking directly up. Due to the lack of features in this view, further navigation from this viewpoint can be difficult or cumbersome, leading to user frustration. According to aspects of the present disclosure, the view of the imagery 320 can be automatically shifted to a more suitable viewpoint so that a user can more easily continue an immersive viewing experience. For instance, the imagery 320 can be shifted to the view depicted in FIG. 6, which depicts more features and facilitates user navigation.

Figure 7:
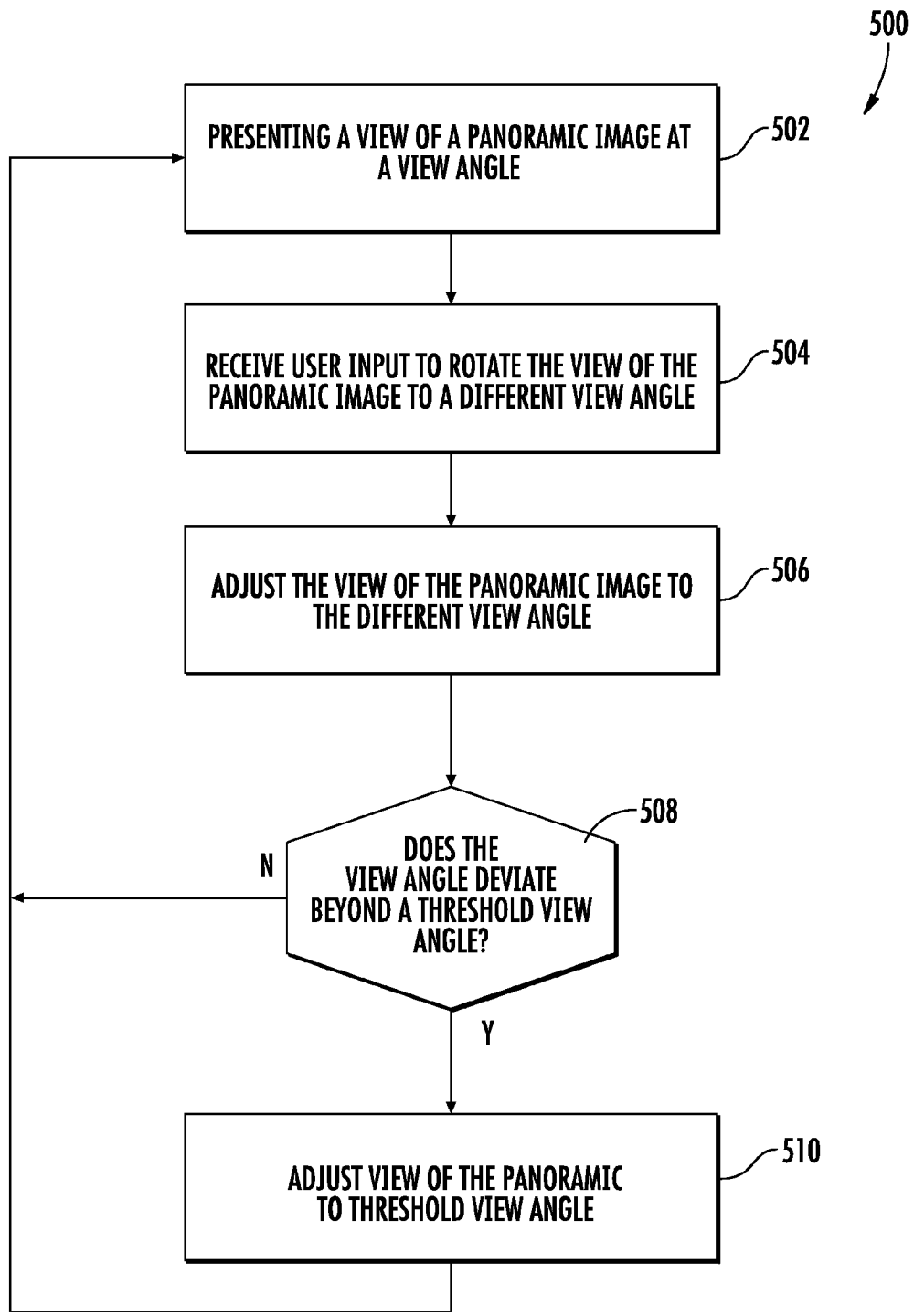
FIG. 7 provides a flow diagram of an exemplary method according to an exemplary embodiment of the present disclosure.

FIG. 7 depicts an exemplary method 500 for presenting panoramic imagery in accordance with aspects of the present disclosure. At (502) the method includes presenting a view of a panoramic image at a first view angle. The first view angle can include a tilt angle associated with the view and/or an azimuthal angle associated with the view. FIG. 2 depicts exemplary street level imagery 320 presented on a viewport 210 of a user interface 200. As shown, the street level imagery 320 provides a view of exemplary 360° panoramic imagery from the vantage point of a first view angle to a user.

Referring back to FIG. 7 at (504), the method includes receiving a user input rotating the view of the panoramic imagery from a first view at a first view angle to a second view at a second view angle. The user input can be user interaction with navigation controls, such as the navigation controls 260 depicted in FIG. 2, that rotate the view of the panoramic imagery from the first view angle to the second view angle. The user input could also be selecting and dragging the view of the panoramic imagery from the first view angle to the second view angle. For instance, a user could adjust the tilt angle of the imagery 320 in FIG. 2 by selecting and dragging the imagery 320 either up or down across the viewport 210. A user could adjust the azimuthal angle of the imagery 230 of FIG. 2 by selecting and dragging the imagery 320 either left or right across the viewport 210. Those of ordinary skill in the art, using the disclosures provided herein, should understand that any suitable user input for rotating the view of the panoramic imagery can be used without deviating from the scope of the present disclosure.

Referring to FIG. 7 at (506), the method adjusts the view of the panoramic imagery from the first view at the first view angle to the second view at the second view angle in response to the user input. For instance, the imagery 320 depicted in FIG. 2 can be adjusted to a second view at a second view angle as shown in FIG. 5.

Figure 6:
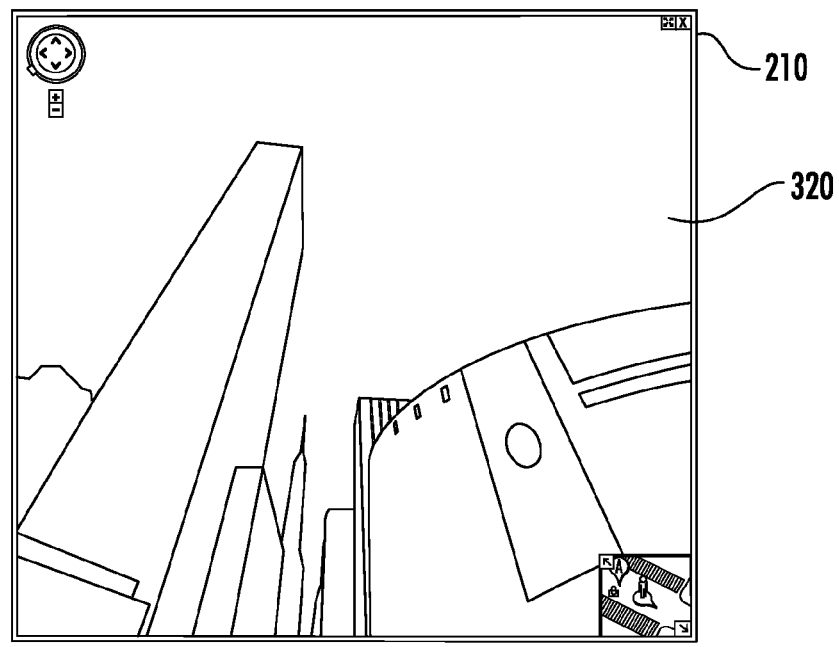
FIG. 6 depicts an exemplary street level image having a tilt angle adjusted to the threshold tilt angle according to an exemplary embodiment of the present disclosure.

Referring to FIG. 7 at (508), the method determines whether the second view angle deviates beyond a threshold view angle associated with the panoramic image. If the second view angle does not deviate beyond the threshold view angle, the view of the panoramic image remains the same and the method returns to (502) until another user input rotating the view of the panoramic image is received. If the second view angle does deviate beyond the threshold view angle, the method adjusts the view of the panoramic image to the threshold view angle (510). For instance, the view of the imagery 320 depicted in FIG. 5 can be adjusted to a threshold view angle as shown in FIG. 6. The threshold view angle is preferably predetermined to provide a desired view to a user. Because the method 500 automatically adjusts the view of the panoramic image to the threshold view angle, situations where a user is stuck in a cumbersome view of the panoramic image can be avoided.

Figure 8:
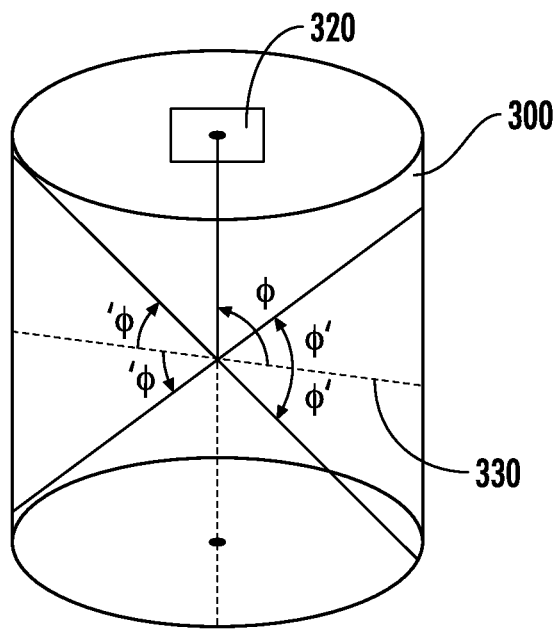
FIG. 8 provides a conceptual illustration associated with the street level image depicted in FIG. 5.

In one exemplary implementation of the present disclosure, the threshold view angle includes a threshold tilt angle for the panoramic image. For instance, FIG. 8 depicts a conceptual diagram of an exemplary 360° panoramic image 300 comprising a plurality of threshold tilt angles $\phi'$. The threshold tilt angles $\phi'$ are defined relative to a horizontal axis 330 associated with the panoramic image 300. The threshold tilt angles $\phi'$ can be defined such that a view at the threshold tilt angle $\phi'$ provides an easily navigable view to a user. For instance, in a particular embodiment, the threshold tilt angles $\phi'$ can be defined to be in the range of about 45° to about 60° from the horizontal axis 330 associated with the panoramic image 330.

If the view angle of the panoramic image 300 deviates beyond any of the threshold tilt angles $\phi'$, the view will shift back to the closest threshold tilt angle $\phi'$. For example, FIG. 5 depicts imagery 320 having a view angle that deviates beyond a threshold tilt angle. This is conceptually illustrated in FIG. 8, which shows the tilt angle $\phi$ of the imagery 320 deviating beyond a threshold tilt angle $\phi'$.

Figure 9:
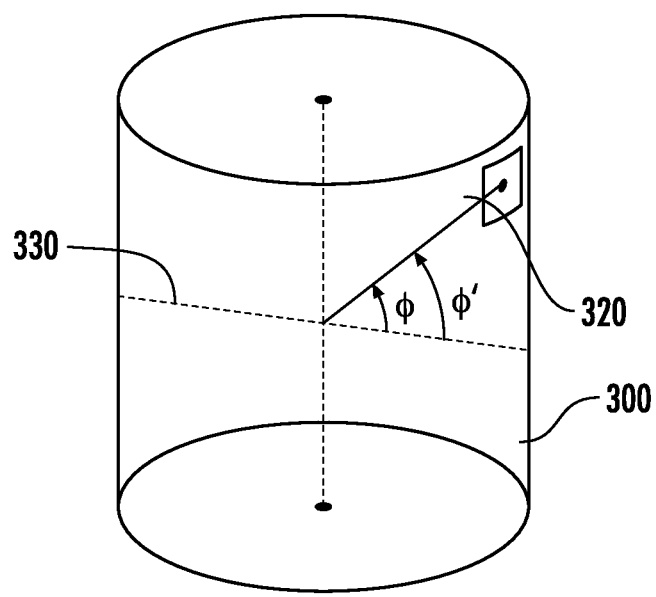
FIG. 9 provides a conceptual illustration associated with the street level image depicted in FIG. 6.

Because the tilt angle of the imagery 320 deviates beyond a threshold tilt angle $\phi'$, the tilt angle $\phi$ of the imagery 320 will be adjusted to be approximately equal to the threshold tilt angle $\phi'$. FIG. 6 depicts the exemplary imagery 320 of FIG. 5 after the view has been adjusted to the closest threshold tilt angle. This is conceptually demonstrated in FIG. 9, which shows the imagery 320 of FIG. 6 having a tilt angle $\phi$ that has been adjusted to be approximately equal to the threshold tilt angle $\phi'$. The view of the imagery 320 of FIG. 6 depicts more features when compared to the view of the imagery 320 of FIG. 5. As a result, a user can be presented with a more easily navigable view of the imagery in the event the user navigates to a cumbersome view, such as view that is looking directly up or looking directly down in the panoramic imagery.

Figure 12:
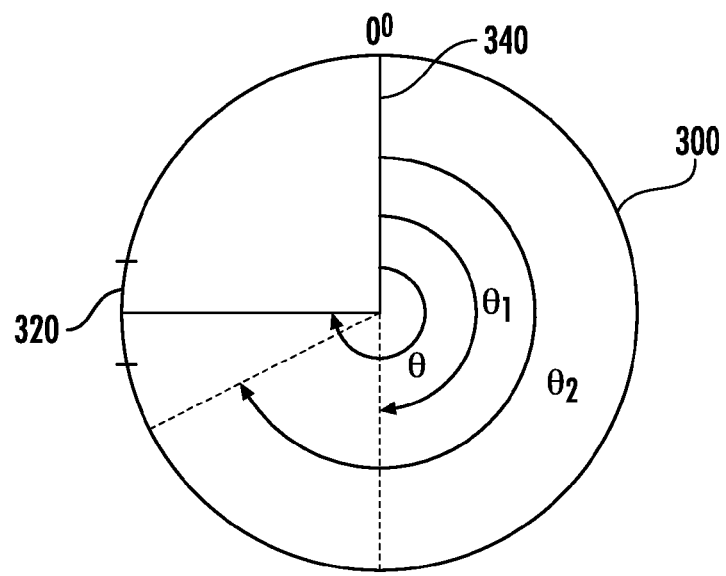
FIG. 12 provides a conceptual illustration associated with the street level image depicted in FIG. 10.

In another exemplary implementation of the present disclosure, the threshold view angle can include a threshold azimuthal angle for the panoramic image. For instance, FIG. 12 depicts a conceptual diagram of an exemplary 360° panoramic image 300 comprising a plurality of threshold azimuthal angles $\theta_1$ and $\theta_2$. The threshold azimuthal angles can be defined with respect to a reference angle 340, such as an angle associated with true north or other direction. The threshold azimuthal angles can be defined based on predetermined views of the panoramic image 300.

In one example, the threshold azimuthal angles can be defined based on canonical views associated with the panoramic image. A canonical view is a view of imagery from a standardized orientation or viewpoint. For instance, canonical views of a geographic area of interest can include a north view, a south view, an east view, or a west view. A canonical view of a geographic area of interest could also include a northeast view, a northwest view, a southeast view, and a southwest view. In other implementations, a canonical view can be generally along a predominate road or vector depicted in the imagery or generally perpendicular to a predominate road or vector depicted in the imagery.

In another example, the threshold azimuthal angles can be defined based on views of predominate features of interest. For instance, the threshold azimuthal angles can be defined to provide the best view of a feature of interest depicted in a panoramic image. For instance, the threshold azimuthal angles can be defined to provide the best view of a building, landmark, intersection, street, or other feature depicted in the panoramic image.

FIG. 12 depicts a conceptual diagram of an exemplary panoramic image 300 having two threshold azimuthal angles $\theta_1$ and $\theta_2$. While two threshold azimuthal angles are depicted in FIG. 12, those of ordinary skill in the art, using the disclosures provided herein, should understand that any number of threshold azimuthal angles can be used as desired. The threshold azimuthal angle $\theta_1$ can be defined based a canonical view associated with the panoramic imagery, such as a south view associated with the panoramic image 300. The threshold azimuthal angle $\theta_2$ can be defined based on a view of a predominate feature of interest, such as the best view of a building 322 (shown in FIG. 11) depicted in the panoramic image 300.

Figure 10:
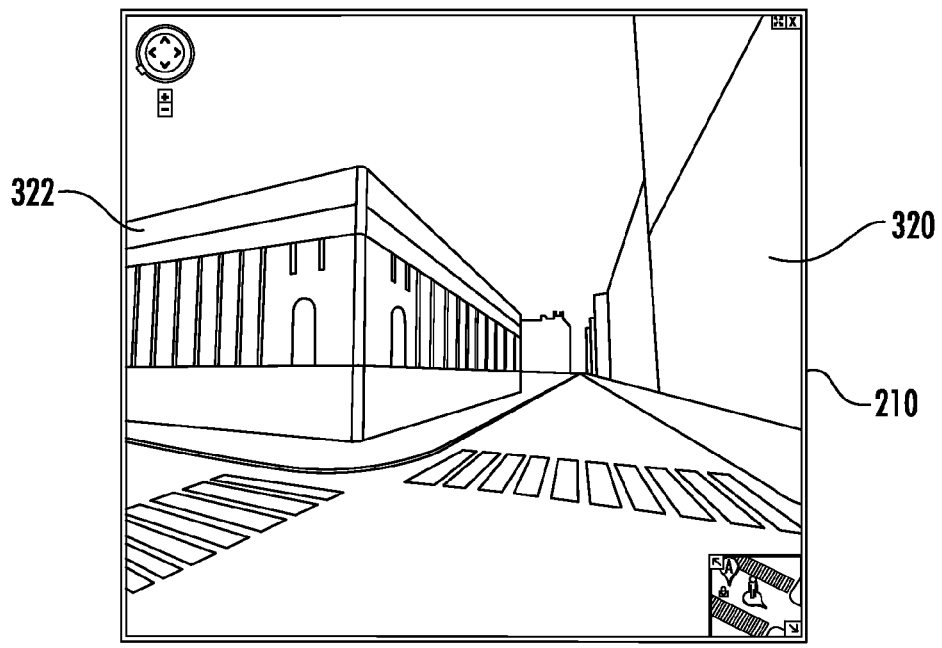
FIG. 10 depicts an exemplary street level image having an azimuthal angle that has deviated beyond a threshold azimuthal angle according to an exemplary embodiment of the present disclosure.

If the view angle of the panoramic image 300 deviates beyond any of the threshold azimuthal angles $\theta_1$ and $\theta_2$, the view will shift back to the closest threshold azimuthal angle. For example, FIG. 10 depicts imagery 320 that has been rotated to an azimuthal view angle $\theta$ that deviates slightly beyond the threshold view angle $\theta_2$. As shown, the imagery 320 of FIG. 10 does not depict a complete view of the building 322 depicted in the imagery 320. This is conceptually illustrated in FIG. 12, which shows the azimuthal angle $\theta$ of the imagery 320 of FIG. 11 deviating beyond the threshold azimuthal $\theta_2$.

Figure 11:
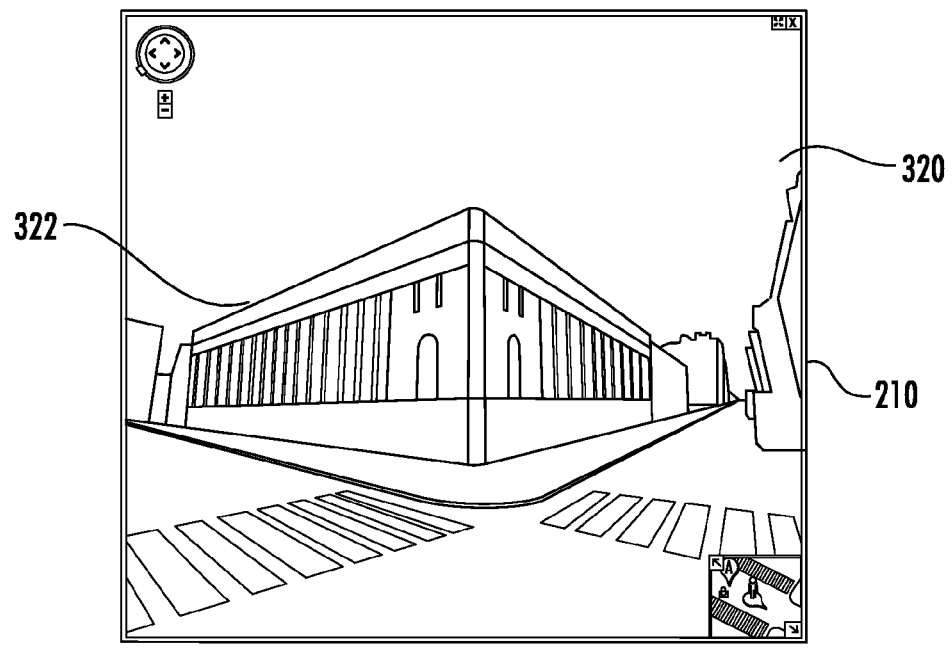
FIG. 11 depicts an exemplary street level image having an azimuthal angle that has been adjusted to a threshold azimuthal angle according to an exemplary embodiment of the present disclosure.
Figure 13:
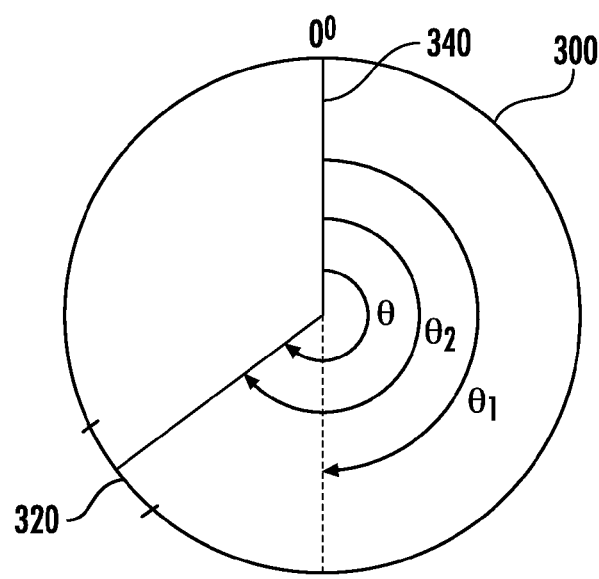
FIG. 13 provides a conceptual illustration associated with the street level image depicted in FIG. 11.

Because the azimuthal angle $\theta$ of the imagery 320 deviates beyond a threshold azimuthal angle $\theta_2$, the view of the imagery 320 will be adjusted to a view angle approximately equal to the threshold azimuthal angle $\theta_2$. FIG. 11 depicts the exemplary imagery 320 of FIG. 10 after the view has been adjusted to the threshold azimuthal angle $\theta_2$. This is conceptually demonstrated in FIG. 13, which depicts the imagery 320 of FIG. 11 having an azimuthal angle $\theta$ that has been adjusted to be approximately equal to the threshold azimuthal angle $\theta_2$. As a result of the threshold azimuthal angle $\theta_2$ begin defined to provide a view of a predominate feature of interest (e.g. the building 322), the view of FIG. 11 provides a better view of the building 320 when compared to the view of FIG. 10. By providing for the adjustment of azimuthal angles, a user can more easily navigate between canonical views or views of predominate features of interest without having to navigate with precision.

To prevent unintended corrections to the view of the panoramic imagery during user navigation, the view angle can be adjusted to a threshold view angle only if the view angle slightly deviates beyond the threshold view angle. For instance, if the view angle deviates beyond a threshold view angle by 20° or less, the view angle can be adjusted to the threshold view angle. However, no adjustments can be made to the view angle if the view angle deviates beyond the threshold azimuthal view angle by more than 20°. As a result, if a user navigates significantly beyond a threshold view angle, the user does not have to worry about the view adjusting to an unintended view angle.

According to a particular aspect of the present disclosure, the view of the panoramic imagery can be adjusted to a threshold view angle by drifting the view of the panoramic imagery to the threshold view angle. Drifting the view can include continuously panning the view of the imagery from the view angle to the threshold angle. For example, a user can rotate the view of the panoramic imagery from a first view angle to a second view angle by selecting and dragging the panoramic imagery across a viewport. Upon user release of the panoramic image, the view of the panoramic imagery can drift or pan from the second view angle to a threshold view angle. Drifting the panoramic imagery allows a user to at least temporarily view the panoramic imagery at view angles beyond the threshold view angle as the view angle drifts to the threshold view angle.

To enhance a user's viewing experience, various transition animations can be used to drift the view angle to a threshold view angle. For instance, in one example, the transition animation can including drifting the view angle to the threshold view angle at a constant drift rate. The drift rate specifies the rate at which the view angle changes over time as the view of the panoramic imagery continuously pans to the threshold view angle. The constant drift rate can be specified to be relatively quick or relatively slow as desired. Using a slower constant drift rate can provide a user more time to view features of the panoramic image as the view of the panoramic image drifts to the threshold view angle.

In another example, the transition animation can include drifting the view angle to the threshold view angle at varying drift rates. The use of varying drift rates can allow the transition animation to provide various aesthetically pleasing effects to a user. For instance, in one example, the drift rate can be decelerated or slowed down as the view angle of the panoramic image approaches the threshold view angle. This can provide an appearance of a easing into the threshold view angle to a user.

In yet another example, the transition animation can include elastically snapping back the panoramic imagery to the threshold view angle. Elastically snapping back the panoramic imagery can include animating the transition such that the view of the panoramic image appears to be supported by an elastic member relative to a threshold view angle. Upon user release of the panoramic image (i.e. after the user ceases to rotate the view of the panoramic image) at a view angle that deviates beyond the threshold view angle, the view of the panoramic imagery snaps back to the threshold view angle in a manner similar to an elastic member snapping back to an equilibrium position after being stretched.

The elastic snap back animation can also be implemented as the user navigates the panoramic imagery. For instance, as a user rotates the view angle of the panoramic imagery beyond a threshold view angle, the view of the panoramic imagery can be animated to simulate the "stretching" of an elastic member beyond an equilibrium position. The further the user rotates the view of the image beyond the threshold view angle, the more difficult it can be for the user to navigate to the view angle. Upon user release of the panoramic image, the panoramic image snaps back to the threshold angle as discussed above.

The use of an elastic snap back animation can improve the viewing experience of the user by informing the user of the locations of the threshold angles. In particular, the snap back to the threshold angle can provide a powerful visual metaphor to a user signifying to the user the location of a threshold angle. In addition, the "stretching" of the view beyond the threshold angle can signify to a user that the user is navigating to cumbersome or less desirable views of the panoramic image.

Other transition animations can be used to provide an improved visual experience to the user. For instance, the view can be animated to bounce or wiggle when it arrives at the threshold view angle. Those of ordinary skill in the art, using the disclosures provided herein, should understand that a variety of transition animations can be used to provide a visually appealing navigation experience to a user without deviating from the scope of the present disclosure.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for displaying a panoramic image, comprising:
   providing for display, by one or more computing devices, a first view of at least a portion of a panoramic image at a first view angle on a viewport of a display device; wherein the one or more computing devices comprise one or more processors;
   receiving, by the one or more computing devices, data indicative of a user input to rotate the view of the panoramic image to a second view angle;
   navigating, by the one or more computing devices, the view of the panoramic image from the first view angle to the second view angle; and
   adjusting, by the one or more computing devices, the view of the panoramic image from the second view angle to an adjusted view angle when the second view angle exceeds a threshold view angle.

2. The computer-implemented method of claim 1, wherein the adjusted view angle is the threshold angle.

3. The computer-implemented method of claim 1, wherein the view of the panoramic image is adjusted, by the one or more computing devices, from the second view angle to the adjusted view angle using a transition animation.

4. The computer-implemented method of claim 3, wherein the transition animation comprises drifting, by the one or more computing devices, the image between the second view angle and the adjusted view angle at a constant drift rate.

5. The computer-implemented method of claim 3, wherein the transition animation comprises drifting, by the one or more computing devices, the image between the second view angle and adjusted view angle at varying drift rates.

6. The computer-implemented method of claim 5, wherein the transition animation comprises decelerating, by the one or more computing devices, the drift rate before the view of the panoramic image reaches the adjusted view angle.

7. The computer-implemented method of claim 3, wherein the transition animation comprises elastically snapping back, by the one or more computing devices, the panoramic image from the second view angle to the adjusted view angle.

8. The computer-implemented method of claim 1, wherein the threshold view angle comprises a threshold tilt angle.

9. The computer-implemented method of claim 7, wherein the threshold tilt angle is in the range of about 45° to about 60° from a horizontal axis associated with the panoramic image.

10. The computer-implemented method of claim 1, wherein the threshold view angle comprises a threshold azimuthal angle.

11. The computer-implemented method of claim 1, wherein the threshold view angle is defined based at least in part on a canonical view of the panoramic image.

12. The computer-implemented method of claim 1, wherein the threshold view angle is defined based at least in part on a view of a predominate feature in the panoramic image.

13. The computer-implemented method of claim 1, wherein determining whether the second view angle deviates beyond a threshold view angle comprises determining whether the second view angle deviates beyond one of a plurality of threshold view angles.

14. The computer-implemented method of claim 13, wherein the method comprises adjusting the view of the panoramic image from the second view angle to the closest threshold view angle if the second view angle deviates beyond one of the plurality of threshold view angles.

15. The computer-implemented method of claim 1, wherein the panoramic image comprises street level imagery.

16. A computing system, comprising:
   a display;
   one or more processors; and
   one or more memory devices, the one or more memory devices storing computer-readable instructions that when executed by the one or more memory devices cause the one or more processors to perform operations, the operations comprising:
   providing for display first view of at least a portion of a panoramic image at a first view angle on a viewport of a display device; wherein the one or more computing devices comprise one or more processors;
   receiving data indicative of a user input to rotate the view of the panoramic image to a second view angle;
   navigating the view of the panoramic image from the first view angle to the second view angle; and
   adjusting the view of the panoramic image from the second view angle to an adjusted view angle when the second view angle exceeds a threshold view angle.

17. The computing system of claim 16, wherein the adjusted view angle is the threshold angle.

18. The computing system of claim 16, wherein the view of the panoramic image is adjusted from the second view angle to the adjusted view angle using a transition animation.

19. One or more tangible, non-transitory computer-readable media storing computer readable instructions that when executed cause one or more processors to perform operations, the operations comprising:
   providing for display first view of at least a portion of a panoramic image at a first view angle on a viewport of a display device; wherein the one or more computing devices comprise one or more processors;
   receiving data indicative of a user input to rotate the view of the panoramic image to a second view angle;
   navigating the view of the panoramic image from the first view angle to the second view angle; and
   adjusting the view of the panoramic image from the second view angle to an adjusted view angle when the second view angle exceeds a threshold view angle.

20. The one or more tangible, non-transitory computer-readable media of claim 19, wherein the adjusted view angle is the threshold angle.

* * * * *